United States Patent

Bright et al.

[11] Patent Number: 6,128,025
[45] Date of Patent: Oct. 3, 2000

[54] EMBEDDED FRAME BUFFER SYSTEM AND SYNCHRONIZATION METHOD

[75] Inventors: Arthur Aaron Bright, Croton-on-Hudson, N.Y.; Stephen Victor Kosonocky, Darien, Conn.; Kevin Wilson Warren, Fishkill, N.Y.

[73] Assignee: International Business Machines Corporation, Armonk, N.Y.

[21] Appl. No.: 09/454,581

[22] Filed: Dec. 7, 1999

Related U.S. Application Data

[62] Division of application No. 09/015,151, Jan. 29, 1998, Pat. No. 6,008,821.
[60] Provisional application No. 60/062,039, Oct. 10, 1997.

[51] Int. Cl.[7] .................................................. G06F 15/16
[52] U.S. Cl. ..................... 345/504; 345/519; 345/509; 713/400; 713/500
[58] Field of Search ................................ 345/501–504, 345/507–509, 519; 713/400, 401, 500, 501, 600

[56] References Cited

U.S. PATENT DOCUMENTS

| | | | |
|---|---|---|---|
| 4,330,852 | 5/1982 | Redwine et al. | 365/221 |
| 4,562,435 | 12/1985 | McDonough et al. | 345/509 |
| 5,608,418 | 3/1997 | McNally | 345/3 |
| 5,608,427 | 3/1997 | Hoffert et al. | 345/508 |
| 5,712,664 | 1/1998 | Reddy | 345/516 |
| 5,757,338 | 5/1998 | Bassetti et al. | 345/3 |
| 5,887,272 | 3/1999 | Sartore et al. | 711/105 |

*Primary Examiner*—Kee M. Tung
*Attorney, Agent, or Firm*—F. Chau & Associates, LLP

[57] ABSTRACT

A multiple embedded memory frame buffer system includes a master graphics subsystem and a plurality of slave graphics subsystems. Each subsystem includes a frame buffer and a color palette for decompressing data in the frame buffer. The master subsystem further includes a digital to analog converter coupled to receive the decompressed digital data from the palette of each subsystem and outputting analog versions of the digital data to an output device. The system further includes a timing system for determining which outputs of the subsystems are to to be converted by the digital to analog converter at a given time. A method of synchronization of embedded frame buffers for data transfer through a single output includes the steps of generating a first clock signal and a second clock signal in a master embedded frame buffer, sending the first and second clock signals to a slave embedded frame buffer and delaying the second clock signal to be in phase with a third clock signal generated by a graphics controller such that no data is lost when transferring data from the master and slave embedded frame buffers.

12 Claims, 9 Drawing Sheets

EMBEDDED FRAME BUFFER SYSTEM AND SYNCHRONIZATION METHOD

CROSS REFERENCE TO RELATED APPLICATION

This application claims priority to Provisional Application Ser. No. 60/062,039 filed Oct. 10, 1997 and is a Divisional of U.S. application Ser. No. 09/015,151, filed Jan. 29, 1998, U.S. Pat. No. 6,008,821.

BACKGROUND OF THE INVENTION

1. Field of the Invention

This disclosure relates to graphics systems and, more particularly, to embedded frame buffers integrated into the graphic systems.

2. Description of the Related Art

The basic components of a video subsystem include a graphics controller, frame buffer, palette/DAC and software device drivers. A VRAM based graphics subsystem for personal computers is typically arranged with a graphics controller device connected to a peripheral component bus, and random access port of one or more VRAM devices.

The center of the graphics subsystem includes a graphics controller (also called a rendering engine), whose basic function is to rasterize the graphical data, defined as conversion of high level geometric primitives issued by software device drivers on a main central processing unit (CPU) to low level pixel values. Each low level pixel value is represented as a binary number composed of either a single 4 bit, 8 bit, 16 bit, 24 bit or 32 bit number, depending on mode selection. The graphics controller also includes a memory controller which is used to control access to a dedicated memory space, which includes a frame buffer and graphics processor memory. The memory controller generates the VRAM refresh signals, and controls the screen refresh process.

An image of the entire screen is stored in the frame buffer. Each pixel value is associated with an x and y pixel location on the screen (with an origin in the upper left corner of the screen). The graphics controller implements an address translation, which maps these x, y pixel locations in screen coordinates to a linear byte address. This linear address is used by a memory controller built into the graphics controller to generate memory control signals and row and column addresses.

The pixel data generated by the graphics controller is transferred to the VRAM frame buffer according to generated row and column addresses, where it is stored and used as the source for refreshing the display at a constant rate. During a screen refresh operation, the graphics controller initiates a transfer of data between the DRAM portion and the SAM memory inside the VRAM, and provides a clock for scanning out the pixel data from the serial access port of the VRAM. The serial port of the VRAM is connected to a Palette/DAC where the pixel data is expanded to 24 bits and is converted to an analog signal to drive a cathode ray tube (CRT), or is directly used to drive a liquid crystal display (LCD).

Video random access memory (VRAM) includes a dynamic random access memory (DRAM) which is interfaced to a serial register/serial access memory (SAM). VRAM typically supports three basic operations which include: bidirectional random access to the DRAM, bidirectional serial access to the SAM and bidirectional data transfer between any DRAM row and the SAM.

The SAM memory is typically the size of a single row (or ½ row) of DRAM memory. This arrangement allows a single transfer of an entire row of DRAM memory to the SAM in a single DRAM access cycle, thereby allowing the data in the SAM to be clocked out of a serial port at a high rate, independent of the DRAM random access port. In a graphics subsystem, VRAM stores an electrical image of the display and is known as a frame buffer.

The Palette/DAC, also known as RAMDAC or palette, provides the function of serializing the data from the VRAM memory into a single pixel bit stream, and passing the pixels to a palette (look-up table) followed by a digital-to-analog converter (DAC) to drive a CRT device.

The palette provides lossless image decompression when the screen image contains fewer than 256 unique colors, as defined by the VGA standard. Prior to the screen refresh, the palette is loaded with 256 mixtures of 8 bit red, green and blue components by the graphics controller. An 8 bit color stored in the frame buffer is applied to the palette to select one of these 256 colors from over 16 million possibilities. The 8 bit color components are then applied to a DAC where they are converted to RGB analog signals for driving a CRT display. The digital color components can also be applied to off-chip driving circuits for driving an LCD display simultaneously. The Palette/DAC part usually also provides a palette bypass path to allow direct storage of the "true" 24 bit color mixtures for direct control of the screen colors. The palette provides a method to store only those colors in the frame buffer that are used to create the screen image, thereby reducing memory requirements. This is at the expense of limiting the maximum number of unique colors that are displayable on the screen at any given time to 256.

In conventional graphics subsystems, VRAM memory devices use separate memory banks thereby expending more energy than necessary. Therefore, a need exists for integrating VRAM devices and a Palette/DAC in a single device. Such an integration would provide a lower power for operation by minimizing the transfer of data between discrete devices. A need also exists for expanding graphics systems by using multiple devices and operating one device as a master device and the others as slave devices thereby permitting a single device to generate synchronizing signals and convert digital data to an analog signal to drive a CRT display.

SUMMARY OF THE INVENTION

A multiple embedded memory frame buffer system includes a master graphics subsystem and a plurality of slave graphics subsystems. Each subsystem includes a frame buffer and a color palette for decompressing data in the frame buffer. The master subsystem further includes a digital to analog converter coupled to receive the decompressed digital data from the palette of each subsystem and outputting analog versions of the digital data to an output device, wherein the system further includes a timing system for determining which outputs of the subsystems are to be converted by the digital to analog converter at a given time.

In alternate embodiments of the multiple embedded memory frame buffer system, the frame buffer may include integrated VRAM devices. The graphics subsystems may permit the use of multiple output devices. The output devices may include a cathode ray tube and a liquid crystal display. The master graphics subsystem may provide pixel data for at least a portion of a digital display. The digital display may be a liquid crystal display. A common reference clock generator may be positioned such that trace delays are substantially equal between the master and slave graphic subsystems to reduce skew between subsystem reference clocks. Each subsystem may include a PLL to lock onto the common reference clock signal.

A computer graphics system includes a graphics controller and an embedded frame buffer region, the embedded frame buffer region further comprising a master graphics subsystem and a plurality of slave graphics subsystems, each subsystem driven by the graphics controller and including a frame buffer and a palette for decompressing data in the frame buffer, the master subsystem further including a digital to analog converter coupled to receive the decompressed digital data from the palette of each subsystem and outputting analog versions of the digital data to an output device, wherein the system further includes a timing system for determining which outputs of the subsystems are to to be converted by the digital to analog converter at a given time.

In alternate embodiments of the computer graphics system, the graphics controller may permit the use of multiple output devices. The output devices may include a cathode ray tube and a liquid crystal display. The timing system may include a common reference clock generator positioned such that trace delays are substantially equal between the master and slave graphic subsystems to reduce delays between subsystem reference clocks. Each subsystem may include a PLL to lock onto the common reference clock signal.

A method of synchronization of embedded frame buffers for data transfer through a single output includes the steps of generating a first clock signal and a second clock signal in a master embedded frame buffer, sending the first and second clock signals to a slave embedded frame buffer and delaying the second clock signal to be in phase with a third clock signal generated by a graphics controller such that no data is lost when transferring data from the master and slave embedded frame buffers.

In alternate methods of synchronization of embedded frame buffers, the step of delaying the second clock signal may include the step of delaying the second clock signal by a programmable number of half cycles of the first clock signal to prevent the second clock signal from falling too early before or rising too early after the third clock signal. The step of maintaining a phase relationship between the first and second clock signals on the slave embedded frame buffer may be included. The step of maintaining may further include the steps of dividing an undelayed first clock signal frequency by two on the master embedded frame buffer, sending the halved frequency to the slave embedded frame buffer and doubling the halved frequency using a PLL with a multiplication of two.

Another method of synchronization of embedded frame buffers to transfer data through a single output includes the steps of sending a reference clock signal to a master embedded frame buffer and a slave embedded frame buffer and generating a first clock signal and a second clock signal in the master embedded frame buffer and the slave embedded frame buffer which are enabled by the reference clock signal such that the second clock signals of the master and the slave embedded frame buffers start on the same cycle of the first clock signals of the master and the slave embedded frame buffers.

In alternate methods of synchronization of embedded frame buffers, the step of synchronizing a third clock signal from a graphics controller with the second clock signal such that no data is lost when transferring data from the master and slave embedded frame buffers may be included.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention relates to the design of a system on a chip (SOC) and more particularly to a system on a chip with embedded frame buffers. In one illustrative embodiment, SOC integrates 16 Mbits of DRAM, digital logic, SRAM, three PLLs (phase-locked loops), and a triple video digital-to-analog converter in a 0.5 micron CMOS DRAM process. Application Specific Integrated Circuit (ASIC) techniques are employed, using multiple DRAM macros with Built-in Self Test (BIST), full Level-Sensitive Scan Design (LSSD) logic, and externally accessible analog circuitry. Issues regarding functional debugging, DRAM macro isolation and a low cost manufacturing test using only a logic tester are also described.

1.0 Introduction

Increasing density of DRAM bits/chip and advances in high speed logic in sub-micron CMOS processes, may provide for the design of a complete system with a large amount of DRAM and significant logic and analog functionality on a single integrated circuit. These "systems on a chip" (SOC) designs may be characterized as including, inter alia, dynamic random access memory (DRAM), logic, static random access memory (SRAM) and special analog functions. Applications that demand high speed operation and low power consumption are advantageous for these new designs. These highly integrated systems create new challenges for testing in terms of reducing costs and allowing accessibility of internal points for functional characterization with limited pin counts using conventional probe cards. Described herein is an illustrative SOC including 16 Mb single transistor DRAM cells, 7 Kb SRAM, triple 8 bit Digital-to-Analog converters, three PLLs and 20K random logic gates made in a 0.5 micron DRAM process. The SOC may be designed as part of a graphics subsystem comprising an embedded frame buffer and Palette/DAC, targeted for mobile platforms, for example. Functionally the SOC provides the logical operation of integrating four standard 4 Mb VRAM chips and a standard IBM Palette/DAC, which are known to those skilled in the art. The chip presents significant design challenges to provide low cost testing using a conventional logic tester and to allow efficient functional debugging and manufacturing testability. To minimize manufacturing costs and allow internal node accessibility, a careful methodology must be used to ensure the SOC is testable and can be successfully debugged. For this, Built-in Self Testing (BIST) logic is used for the DRAM arrays, along with multiple conventional LSSD scannable register paths, and a programmable bypass path to an integrated Digital-to-Analog converter. Furthermore, an interface between the VHDL design verification system and the logic tester may be used to simplify creation of test vector patterns and reduce functional debug time.

2.0 Chip Architecture

Figure 1:
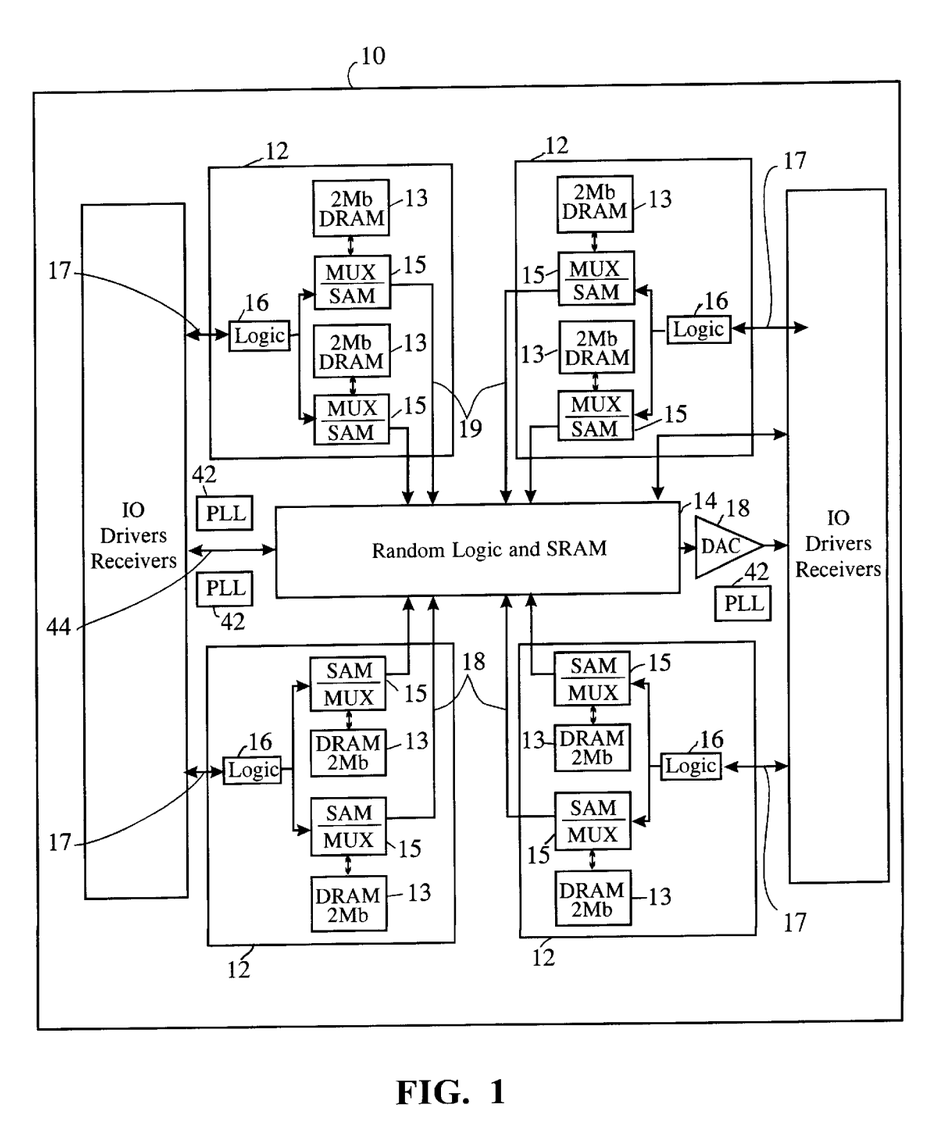
FIG. 1 is a block diagram of a system on a chip with embedded frame buffers in accordance with the present invention.

In a preferred embodiment, SOC may be used as a back-end of a personal computer graphics subsystem. Referring now in specific detail to the drawings in which like reference numerals identify similar or identical elements throughout the several views, and initially to FIG. 1, a top level block diagram is shown. A system on a chip (SOC) 10 is constructed into four identical memory quadrants 12 and a central logic/analog region or Palette/DAC 14. Each memory quadrant includes 4 Mbits of DRAM memory made using, for example, a one-transistor trench-cell capacitor cell. The memory quandrants 12 are organized as two 2 Mb DRAM macros each with 512 rows, 16 columns and 256 input/output bits, and including an independent BIST engine with programming ROM 13. An industry standard VRAM operation is provided by an additional 4 Kb of serial access memory (SAM) 15 connected to each memory quadrant 12, implemented with fully scannable latches, and a random logic interface 16 constructed with standard cells to provide a VRAM random access port. The SOC 10 allows random DRAM I/O through the VRAM logic port and wide serial transfers of the DRAM memory array into static SAM arrays. The data transferred into the SAM array can then be read out into logic sections in region 14 at a high rate, then pipelined through an SRAM palette also in region 14, and out a digital port for driving an LCD display or through a triple 8-bit D/A converter 18 for connection to a cathode ray tube (CRT). SRAM and register programming is done through a dedicated 8 bit microprocessor bus directly connected to the random logic macro in region 14.

Figure 2:
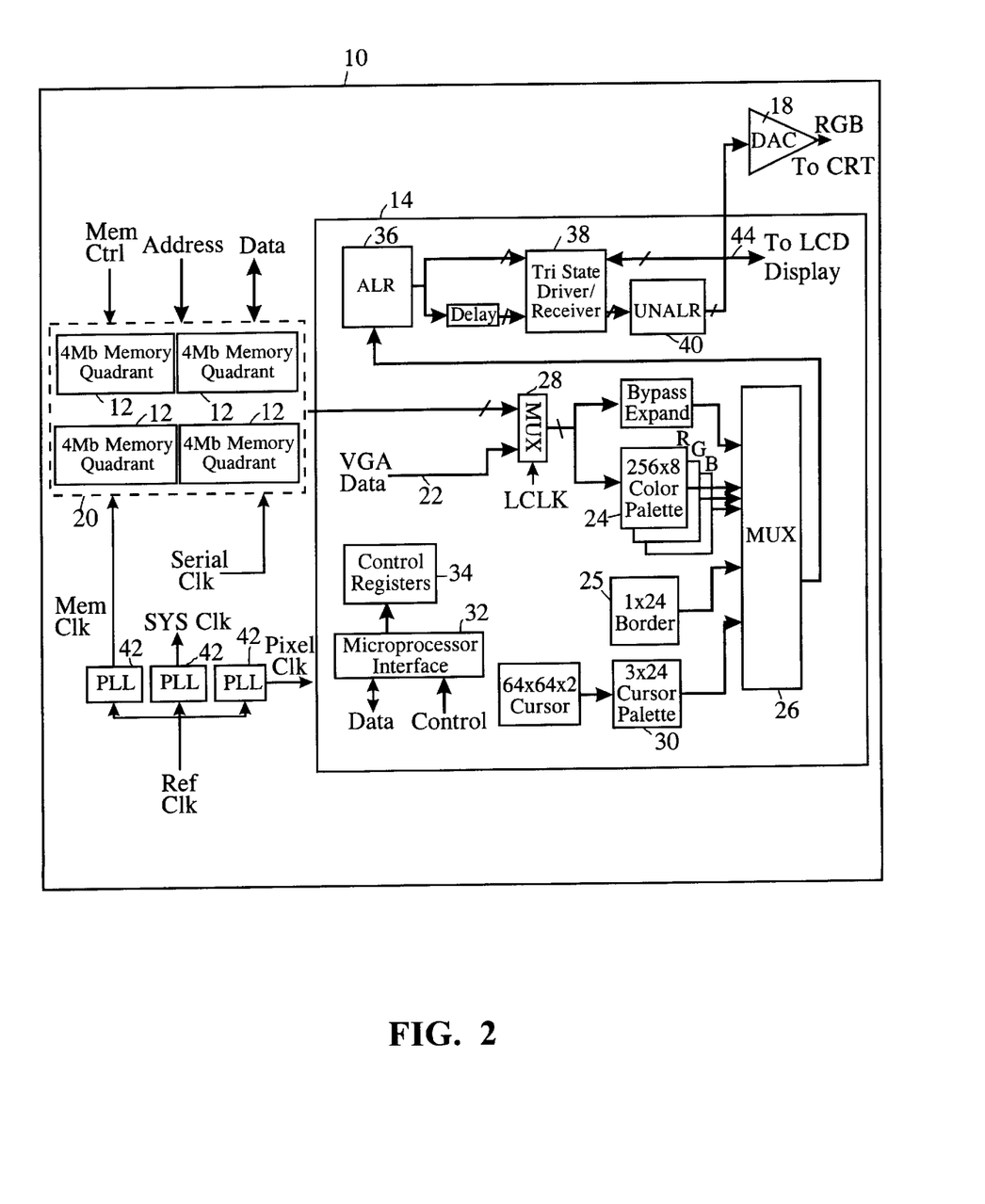
FIG. 2 is a logic diagram of the system on a chip with the embedded frame buffers in accordance with the present invention.

Referring now to FIG. 2, a detailed block diagram of logic/analog region 14 of SOC is shown. A frame buffer 20 is embedded on SOC 10. More detail will be described herein.

3.0 Test Methodology

One important aspect of an SOC chip design is the ability to reduce test time during manufacturing while supplying a customer with functional parts. This is magnified for SOC, where traditionally different technologies are merged into a single integrated circuit. Circuit design techniques that include Level Sensitive Scan Design (LSSD), IEEE 1149.1 (JTAG), Built-in Self Test (BIST) and redundancy are needed to detect and correct manufacturing defects. Equally important is the ability to functionally debug an integrated circuit efficiently. The following describes techniques employed for SOC.

3.1 LSSD-Testing

Testing of the SOC requires the separate application of several distinct test methodologies to the various portions of the SOC. The logic portions are tested using IBM's ASIC test methodology, which is based around level-sensitive scan design (LSSD). In this methodology, each storage element, such as an edge-triggered D flip-flop, incorporates a pair of level-sensitive d-latches connected to two non-overlapping clocks. These latches are connected in series throughout the design to form the scan chain. This dual clock scheme eliminates concerns about timing within the scan chain, and makes clock-gating logic testable. IBM ASIC methodology provides an option for designing circuits with these conventional LSSD latches controlled by two non-overlapping clocks generated from a shared clock splitter. This clock-splitter cell accepts an edge-triggered system clock, two level sensitive test clocks and a testmode gating signal. A third clock, the scan clock, is directly connected to each register to clock in scan data into the master latch. Another style of storage element, embeds the clock splitter into a master/slave latch pair standard cell and also provides a clock gating signal to disable the functional edge triggered clock and allow a "d-mimic" register to be controlled by three level sensitive test clocks during testing. This type of register allows standard non-LSSD edge triggered flip-flop designs to be mapped easily to fully LSSD compatible designs with an area penalty. This was the primary random logic storage cell used throughout the design illustrated herein. In the present case, the SOC includes several different clock domains and different types of latches, making it necessary to use multiple copies of the test clocks to avoid violation of LSSD design rules.

Determination of test coverage and test vector generation is accomplished with Testbench, an automated software tool developed by IBM. This tool reads in the entire chip netlist, calculates the test coverage for different fault models and generates test vector patterns for downloading to a tester. Testbench will also analyze the chip design for non-testable regions or violations in the LSSD test methodology, to allow correction before submission to manufacturing.

3.2 Boundary Scan

Boundary scan is implemented within IBM for both internal logic testing and for facilitating the testing of I/O structures and interconnects. Within this methodology, interconnect testing is IEEE 1149.1 (JTAG) compliant. Although LSSD and JTAG standards are not compatible, special boundary scan cells have been developed by IBM ASICs division, which can be operated in both modes, LSSD and IEEE 1149.1.

3.3 Built-in Self Test (BIST)

Traditional memory testing requires specialized testers with large amounts of memory to map the faults in a memory array and optimally choose the most efficient use of redundant rows and columns. For SOC, use of a specialized tester for the memory section may add to the manufacturing cost which decreases the utility of using integrated DRAM. The design trade-off is the increase in die area of the additional BIST engine. Another consideration of using BIST for repair of the memory array, is flexibility in choosing the proper algorithm to detect and repair the faults. Each manufacturing process has peculiarities that cause circuit defects, and algorithms and test programs are often tailored for that process. The DRAM macros used for this design include a dedicated programmable BIST engine with programming ROM, allowing the ability to tailor the BIST algorithm for changes in the process. In this technique or method, the BIST logic is tested during LSSD chip testing, then the BIST engine is initialized via scan and is run to test the DRAM macro. In the present case, the DRAM macros are equipped with a programmable BIST circuitry which tests the DRAM and determines the fuses to be blown to allocate redundant rows and columns for repair. An advantage of this approach is that the chip can be tested entirely on a single tester, avoiding the need for testing the DRAM and logic portions on separate testers. Burn-in is accomplished by running the BIST tests with elevated power supplies.

3.4 VHDL Functional Simulation/Test Vector Interface

Test vector generation for functional debugging increases greatly for the SOC. A link between VHDL design verification and a logic tester is fundamental in reducing the time for functional debugging of the SOC. For this, a VHDL testfixture system is used to wrap around a VHDL design verification system, to capture the digital signals at the ports of the device under test (DUT). The VHDL testfixture provides a general purpose simulation environment for VHDL models. The primary intent of testfixture is to provide a vector based mechanism for record and playback of simulations from files. The word "vectors" in this context means that the simulation events are recorded and asserted on equally spaced intervals of time, called vector intervals, in much the same way that an actual tester operates. Each vector is therefore a combination of driven inputs to and expected outputs from the DUT that will be asserted during a particular vector interval.

The testfixture tests the DUT on the basis of an I/O list, and therefore the testfixture may be used on different architectures of the same part; notably on a behavioral model or on an actual netlist for the DUT. The testfixture allows for reading and writing of vector files in the same format. Therefore, a file may be read including only stimulus to the inputs of the DUT, and a file may be written that includes the stimulus and the actual response of the DUT. When a file with expected data is read into the simulation, the expected data is compared with data from the DUT and used to generate an automatic miscompare signal. This miscompare signal can be interpreted as an error signal, subject to the exact timing specifications for the part. The error signal generates a textual warning message whenever it rises, which flags potential problems with the simulation. In this way, the behavior of any given architecture can be rigorously compared against the behavior of another architecture, over any specific set of simulation vectors. The testfixture provides a convenient means of simulating the testbench test data in a VHDL testfixture, since this data is easily parsed into a testvector format. The vector file is then translated to a proper format to drive an Hewlett Packard 82000 144 pin tester or a Hewlett Packard 83000 64 pin tester, both commercially available.

3.5 Tester

An SOC has a characteristically high pin count. As functions are merged together, total pins needed on a package tends to increase, although the total pins as compared to the discrete system is less. Limited pin testing dictates pin sharing and test pin and functional pin Muxing. Design trade-offs may be employed to enable functional pins to be visible for system debugging, along with test pins for manufacturing qualification. For a particular SOC design, two testers are used for general chip debug and manufacturing defect testing, each with unique advantages. One approach is to use a Hewlett Packard 82000. Up to 144 pins are supported with between 64K and 256K test vectors/pin. A Hewlett Packard 83000 with 64 pins and 4M test vectors/pin may also be used. However, the larger pin count available on the 82000 allows more convenient functional testing. Stimuli could be applied and responses collected directly. An iterative approach using boundary scan to scan in a test vector to each receiver latch and run the system clock is sometimes too cumbersome and time consuming. The relatively shallow memory depth limits stuck-at fault testing. This may be considered an acceptable trade-off, however. Also the bulk of the chip is DRAM, testable via the dedicated BIST engines. Note that in addition to the pins cited above, there are also several vdd/gnd pins as well as analog I/O pins. The HP-83000 allows pico probing, as well as enabling cleaner signals. E-beam testing is also useful for characterization of the PLL circuits.

4.0 Testable Design Methodology Applied to "System on a Chip"

It is advantageous to determine a way to isolate the DRAM macros from the rest of the logic by LSSD scannable registers. This boundary between the DRAM and the rest of the system is at the SAM. Functionally, the SAM appears as a single d-latch with a level sensitive clock, where each bit actually contains a second slave "L2" latch to provide a completely scannable boundary to the logic section. This design trade-off caused a near doubling of the die-area for the implementation of the SAM registers to account for about 18.8% of the total die area, for example, but allowed complete scan testing of the 16 Kb register and macro isolation of the DRAM. The overhead for general logic LSSD testing is mostly confined to the dedicated clock splitters incorporated in the "d-mimics" used throughout the chip as storage registers as well as the additional scan input into a master latch.

4.1 Scan Chains

Choice and connection of scan chains can influence the ease of testing and isolation of portions of the system. The SOC contains 19 independent LSSD scan chains summarized in Table 1. Each DRAM macro has two scan chains chained together. Each SAM has a single scan chain, while the logic section 14 (FIG. 1) is divided into 3 independent scan chains. Also included in the design is a JTAG boundary scan connected around the I/O periphery. The scan chains were chosen to allow the independent testing of the DRAM macros with the rest of the chip. The SAM macro scan chains provide a boundary between the DRAM and the rest of the chip. Functional testing at normal operational speed is possible by scanning in a test pattern at low speeds with aclk (scan-in load clock), bclk (slave latch clock) pulses, loading data patterns into each of the SAM registers, then running the system with the main system clock.

TABLE 1

| MACRO | Scan chains no. scan chains | no. bits/chain |
|---|---|---|
| DRAM macros | 8 | 2463 |
| SAM macros | 8 | 2048 |
| Logic chain 1 | 1 | 3099 |
| Logic chain 2 | 1 | 3016 |
| Logic chain 3 | 1 | 2112 |

4.2 DRAM Macro Testing

Another goal in the design of the SOC was to enable low-cost manufacturing testing on a logic based test system. As described above, the use of BIST for DRAM testing make this possible. The DRAM macro test sequence is divided into two sections: first testing the BIST for stuck-at faults and functional integrity and second, running the BIST engine to test the memory arrays. The sequence of steps for verification of the BIST engine includes the following steps:

(1) Scan in data for each BIST functional test (2) Run the BIST engine for a specified number of cycles (3) Scan out data for fault checking Similarly, the sequence of steps for array verification includes:

(1) Scan in data for each array test (2) Run the BIST engine for specified number of cycles (3) Scan out data containing redundancy information to determine proper fuse blowing.

Generation of the test data may be accomplished by using a macro isolation capability within ASIC test methodology. The macro is isolated from the rest of the chip while simultaneously being controlled directly from the chip I/O ports, by application of appropriate stimuli to the I/O ports and to latches controlling the macro inputs.

4.3 Testing Analog DAC

At speed testing of DAC 18 may be accomplished by using a Liquid Crystal Display port 38 (FIG. 2) in chip 10, which provides the digital pixels to an attached LCD. The LCD display port 38 is a bi-directional two pixel wide port (24 bits/pixel), shown in FIG. 2, which is run at ½ the internal pixel clock frequency. The chip may be programmed, so that the LCD port reads two pixels into the chip and converts the pixels to a single high speed pixel path attached to the triple 8-bit DAC input latches. This facilitates testing the DAC, by removing dependence of the operation from much of the remaining logic, DRAM and SRAM on the chip.

For manufacturing testing, an analog portion of the DAC includes three built-in voltage comparators that may be used to test analog crossing points. The comparator outputs are accessible by internal registers or external pins. This allows for gross pass/fail testing of parts at high speeds on a digital logic tester.

4.4 General Test flow

A general manufacturing test flow includes the following steps:
(1) a Parametric wafer test
(2) LSSD logic tests
(3) a BIST test on DRAM arrays
(4) a Fuse blow test
(5) Rerun LSSD tests
(6) Rerun BIST test on DRAM arrays
(7) Dice & Package good chips Steps 5 and 6 above are repeated to ensure no defects were caused during wafer transport and fuse blowing. A general concern is to minimize the number of times each pad is probed to reduce damage inflicted by the testing procedure.

A "System on a Chip" incorporates DRAM, logic and analog circuitry. For successful design and manufacturability of complex integrated systems, which were traditionally tested on different test platforms, require early planning in the design cycle, with test structures embedded in the design at the earliest stages of the design cycle. An ASIC design approach may be employed to reduce test costs during manufacturing while also allowing functional debug and characterization. A VHDL software link between the system verification system and the logic tester may be used to generate functional debug test vectors. An automated LSSD testpattern generator, TestBench, available from IBM may be used to generate the LSSD testpatterns for manufacturing testing.

SOC 10 (or the chip) for expanding the memory of a graphics sub-system in accordance with the present invention is described in further detail herein. An embedded frame buffer 20 is used by tiling multiple devices, each driving a portion of an LCD display while also allowing a single device to become a "master" device which provides analog output compatibility for driving a CRT (Cathode Ray Tube) display. The described system includes 16 Mb-1 transistor DRAM cells, 7 Kb SRAM, triple 8 bit Digital-to-Analog converters, three PLLs and 20K random logic gates designed as part of a graphics subsystem comprising a frame buffer and Palette/DAC, targeted for mobile platforms. Functionally the chip provides the logical operation of integrating four standard 4 Mb VRAM chips and a standard IBM Palette/DAC.

Chip Architecture

The chip may be used as a back-end of a personal computer graphics subsystem. Referring again to FIG. 1, chip 10 is constructed into four identical memory quandrants 12 referred to herein as an embedded frame buffer 20 (FIG. 2) and a central logic/analog region 14. Each memory quadrant contains 4 Mbits of DRAM memory made using, for example, a one-transistor trench-cell capacitor cell. The memory quandrants 12 are organized as two 2 Mb DRAM macros each with 512 rows, 16 columns and 256 input/output bits, and an independent BIST engine with programming ROM 13, 4 Kb of serial access memory (SAM) 15 using fully scannable L1, L2 latches (not shown), and a random logic interface constructed with standard cells to provide an industry standard VRAM random access port 17. Chip 10 allows random DRAM I/O through VRAM port 17 and wide serial transfers of the DRAM memory array into static SAM arrays. The data transferred into the SAM array can then be scanned out into the logic section 14 at a high rate through serial ports 19, then through an SRAM palette, then out a digital port 44 for driving an LCD display or through a triple 8-bit D/A converter 18. SRAM and register programming is done through a dedicated 8 bit microprocessor bus directly connected to the random logic macro or palette 14.

Referring again to FIG. 2, a detailed block diagram of the logic/analog section of chip 10 is shown. Relevant clocks used in the system are a pixel clock (PCLK) used to internally clock pixel data through a Palette/DAC portion or palette SRAM 24 of the logic. This clock is typically generated from a reference REFCLK signal applied to chip 10. An SCLK, which is derived from the PCLK and sent as an output to a graphics controller, is used internally in the Palette/DAC 14 of the logic to provide a synchronous signal to a graphics controller 50 (FIGS. 7 and 9) for generation of an LCLK, which is used to load data from the memory section to the Palette section. The LCLK is a synchronous signal derived from the SCLK by the graphics controller 50 and is gated according to software in the graphics controller 50.

An embedded frame buffer 20 is indicated. Data either from frame buffer 20 or fram a VGA data input are synchronized to LCLK, serialized and resynchronized to PCLK. The data are optionally passed through palette 24 which translates and decompresses color data. A multiplexer 26 selects direct or palettized pixel data from palette SRAM 24, or a border color from a border register 25 or a cursor image from cursor palette 30. The data are then processed by an Active Line Repair (ALR) macro 36, which inserts extra pixels into the data stream for restoring a full image on LCD panels with broken column lines (which would otherwise result in line defects in the display). The pixel or data stream is then widened to two pixels wide at half the pixel clock frequency for driving to the LCD display. An UNALR macro 40 is used to recombine and reserialize the pixel data from two or more chips 10 (FIG. 3) which may be connected in parallel.

Figure 7:
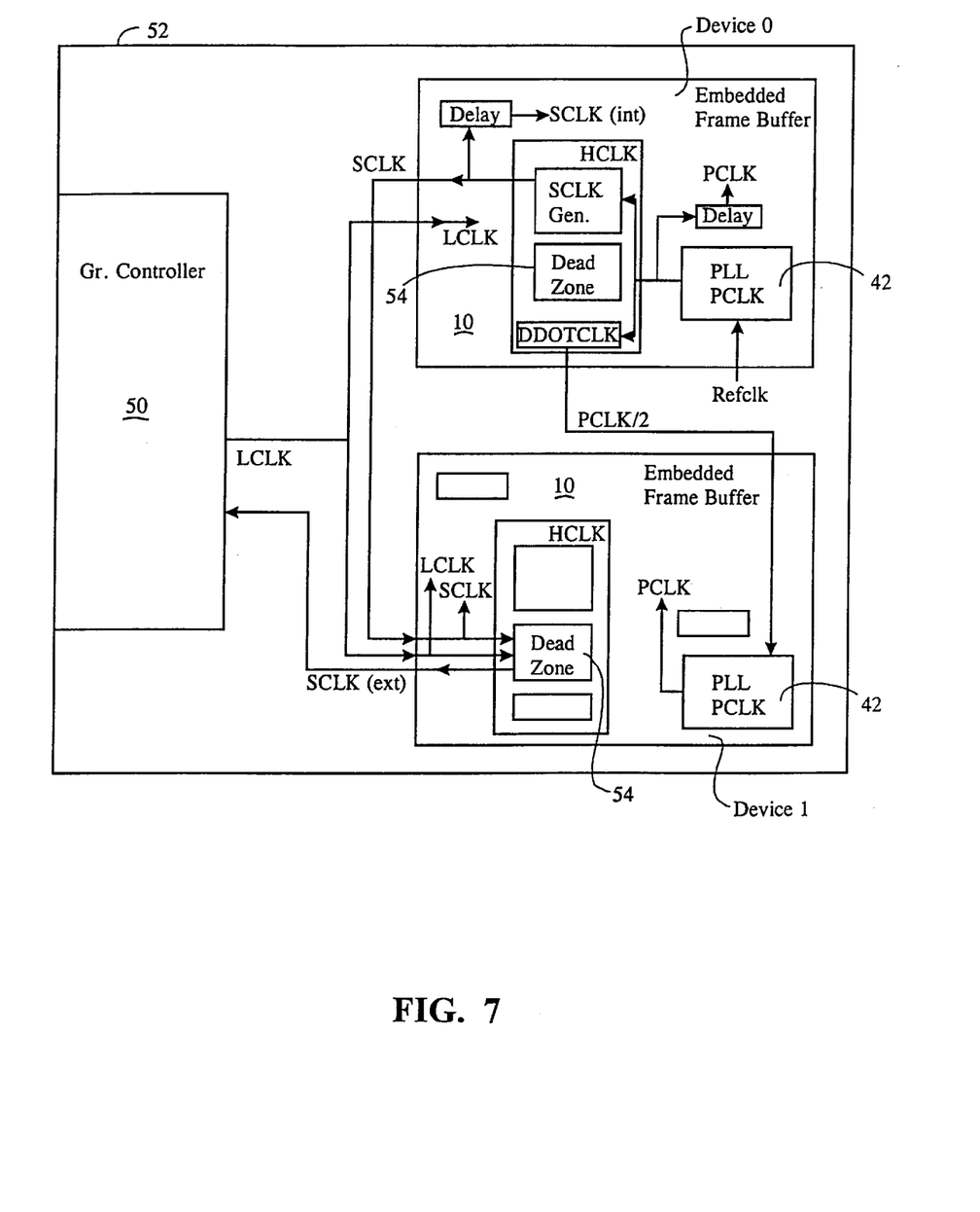
FIG. 7 is a schematic diagram showing a clock synchronization method in accordance with the present invention.
Figure 9:
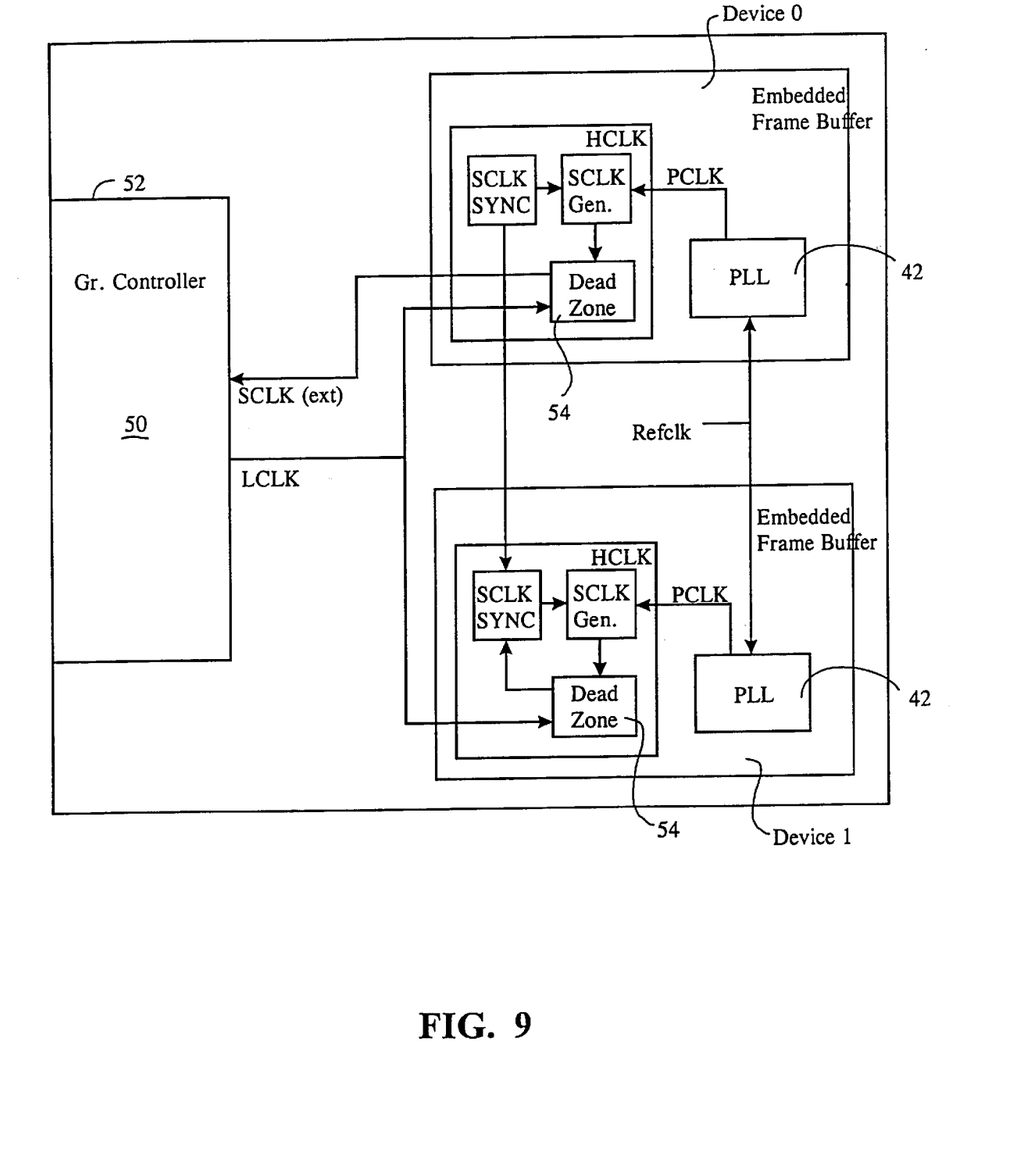
FIG. 9 is a schematic diagram showing another clock synchronization method in accordance with the present invention.

Chip 10 also includes three phase locked loops (PLL) 42 which generate the clocks, and a microprocessor interface 32 which is used to load various control registers 34 as well as cursor SRAM 30 and palette SRAM 24 from a port (shown as data and control I/O into microprocessor interface 32) driven by graphics controller 50 (FIGS. 7 and 9).

In one embodiment, the 2 MB embedded frame buffer 20 supports expansion to a system using multiple embedded frame buffer devices used with a single graphics controller 50. The graphics controller may address 4 MB or more of total graphic subsystem memory. An expanded operation mode allows a single DAC 18 to be designated to drive an analog CRT simultaneously with a digital output for the LCD driver circuit. Each embedded frame buffer device 20 is designated as a distinct memory bank in a multi-banked memory system.

Figure 3:
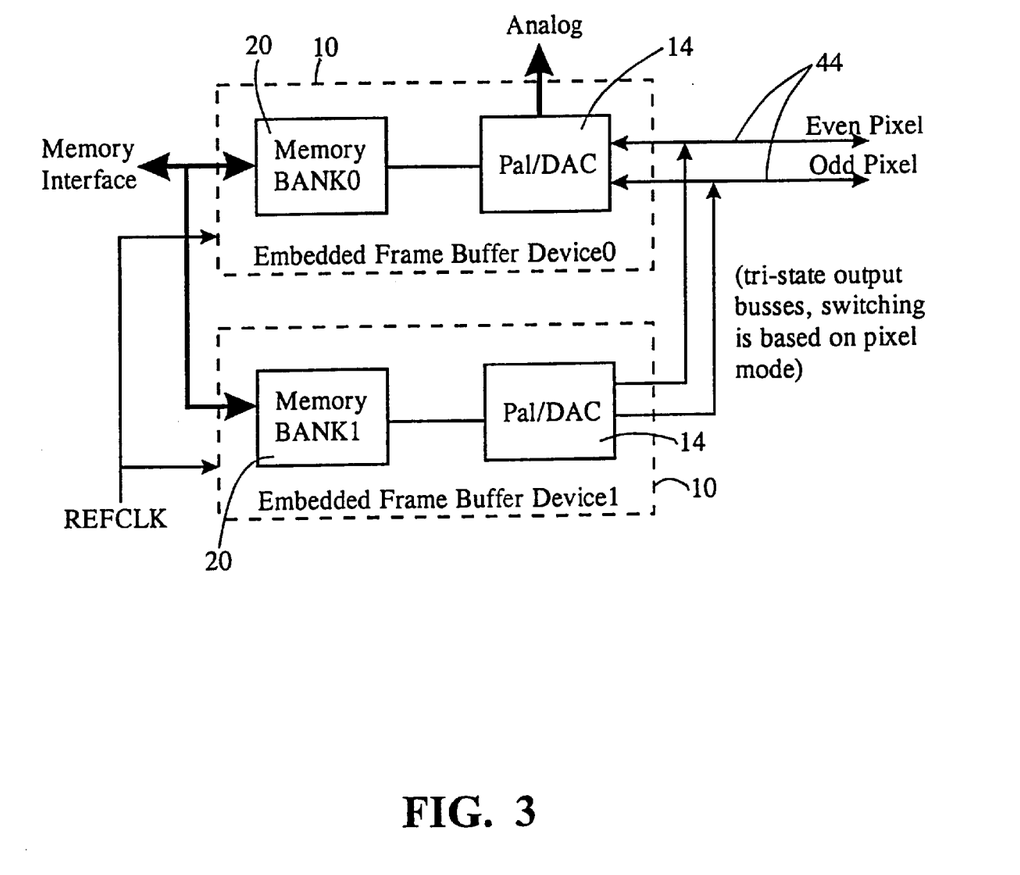
FIG. 3 is a block diagram of dual embedded frame buffers.

Referring to FIG. 3, a diagram of a dual SOC 10 with embedded frame buffers are shown as an illustration of one embodiment of the present invention. Chips 10 include device 0 and device 1 also referred to collectively as embedded frame buffer devices. Device 0 is designated as a master device by setting a SLAVE pin low and DAC_EN (DAC enable) high, activating three integrated DACs, for example, Red, Green and Blue analog outputs. Normally the DAC_EN bit is held low for mobile operation. For dual embedded frame buffer device operation, a design may include a common reference clock generator (REFCLK) situated such that equal trace delays between the two embedded frame buffer devices are as close as possible so that a minimum skew exists between the embedded frame buffer device reference clocks. Each embedded frame buffer device uses its own PLL to lock onto the common reference clock.

In a dual embedded frame buffer device mode, the graphics controller 50 writes data simultaneously to both embedded frame buffer device interfaces 32 on each chip. For control signals which are required to have different values on the two chips, duplicate registers may be be provided, one with a Master value, for example, and one with a Slave value. The Slave pin may be used to select the appropriate register 34 for each chip.

Two pixel buses 44 are shared between the two embedded frame buffer devices which allow concurrent odd and even pixels to be driven by one of the two embedded frame buffer device chips. Alternatively, a single pixel output mode is available by setting an OUTWIDTH bit to '1'. Within each embedded frame buffer device, eight bytes are transferred from the memory bank of frame buffer 20 to a Palette input MUX 28 (FIG. 2) at a serial clock rate. This memory bank output data is further serialized to the width of a pixel, determined by the pixel format register as 4, 8, $^{15}/_{16}$, 24 packed, or 32 bits per pixel.

Figure 4:
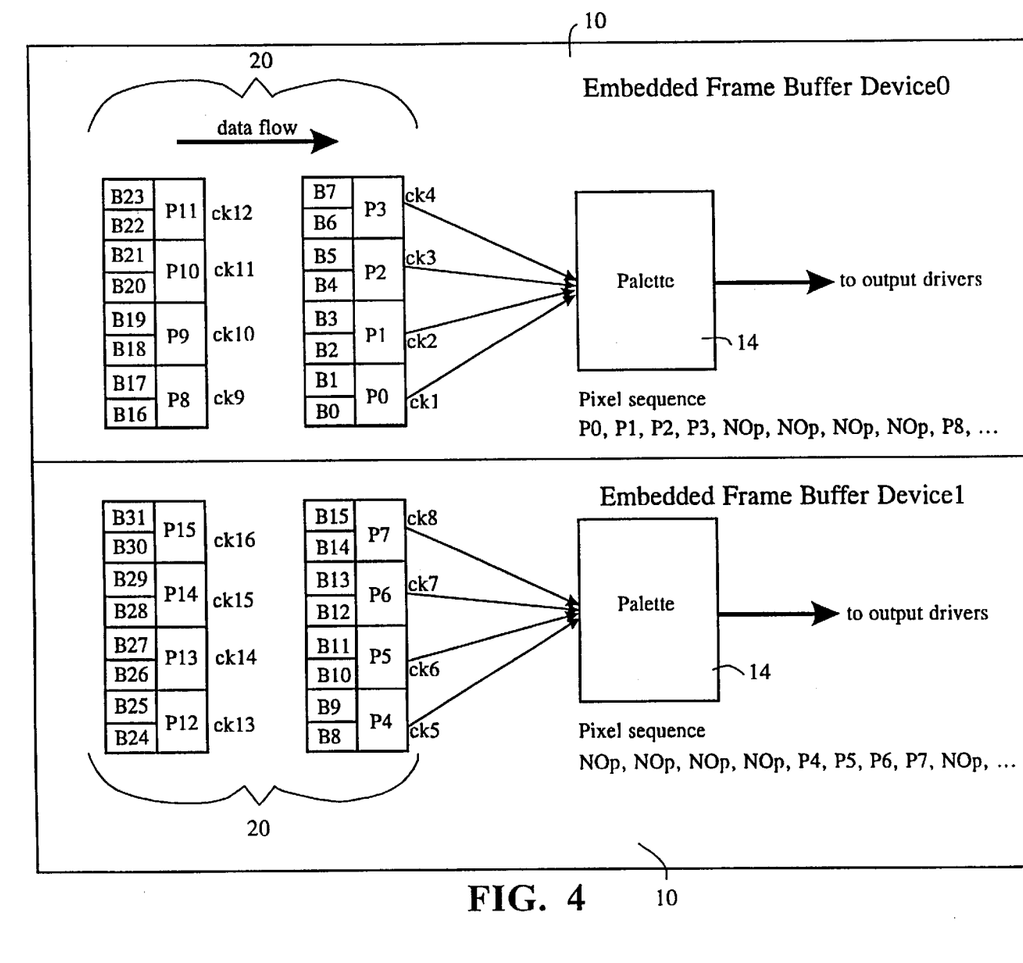
FIG. 4 is a schematic diagram of data flow through embedded frame buffer devices for a 16 bpp mode.
Figure 5:
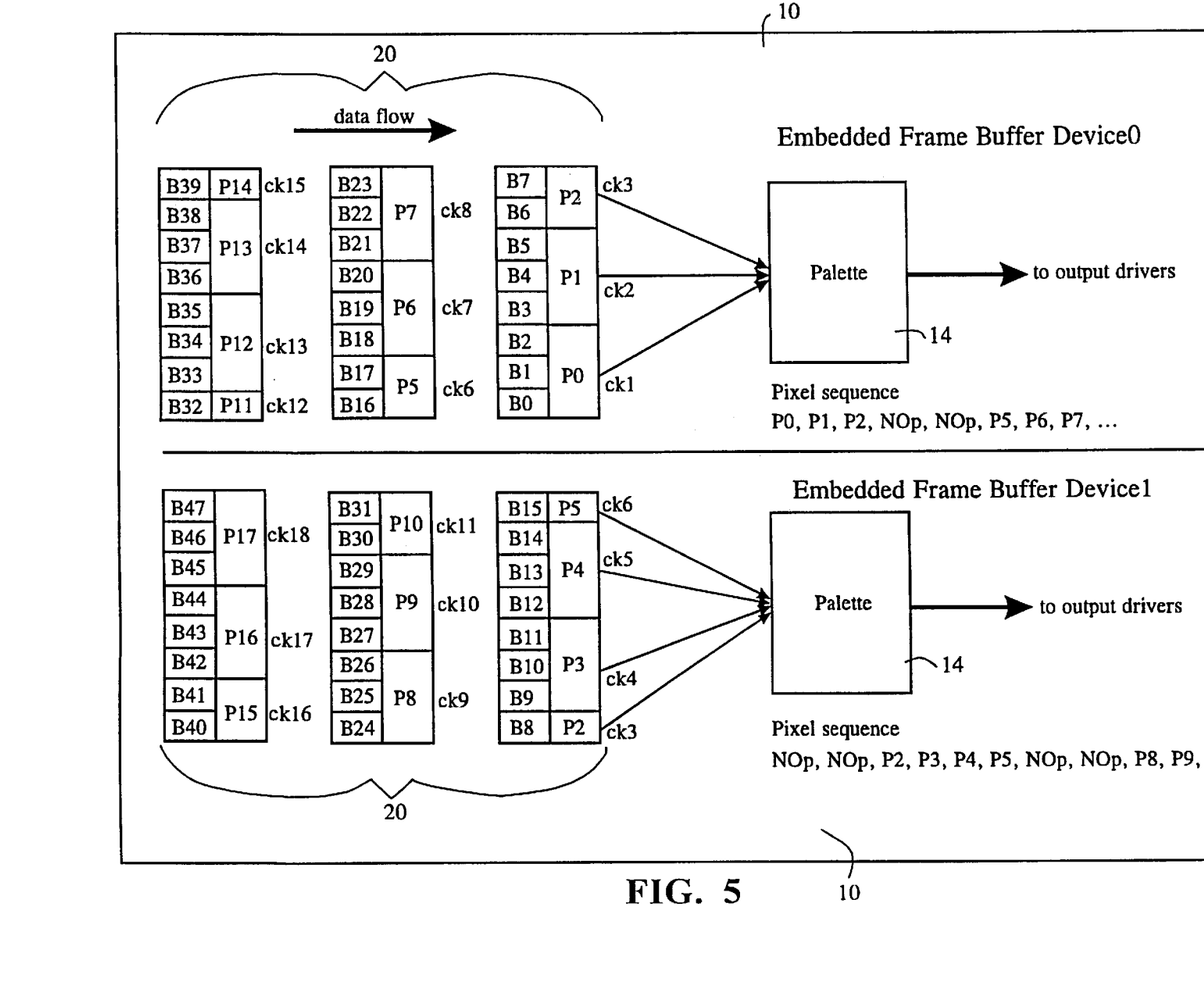
FIG. 5 is a schematic diagram of data flow through embedded frame buffer devices for a 24 bpp packed mode.

Referring to FIG. 4, pixel data transfer between a SAM macro in frame buffer 20 and input MUX 28 in a Palette macro 14 for 16 bit/pixel (bpp) mode is shown. FIG. 5 shows special timing requirements for dual embedded frame buffer device operation in 24 bpp packed mode. FIGS. 4 and 5 show the data flow in terms of byte numbers (B0, B1, etc.) and pixel numbers (P0, P1, etc.) into input MUX 28, and the pixel clock cycle (PCLK) in which each embedded frame buffer device is active and where the data is scanned from each MUX. Output drivers or tri-state driver/receiver circuits 38 (shown in FIG. 2) then alternately drive whole pixels or partial pixels onto pixel bus lines, depending on the clock cycle. A pixel sequence describes the order which pixels are scanned into each embedded frame buffer device and the relationship between pixel clock cycles (PCLK) (shown as clk1, clk2, etc.) within each embedded frame buffer device. Examples of pixel sequences are given in FIGS. 4 and 5.

Figure 6:
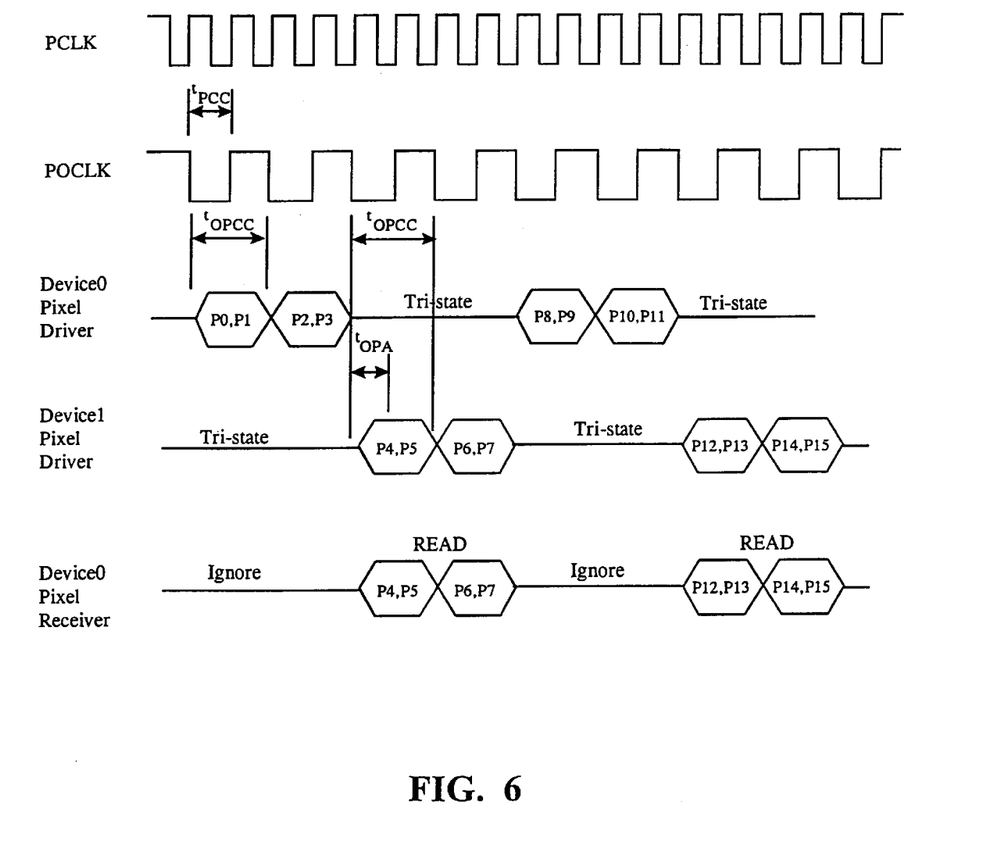
FIG. 6 is a timing diagram for an output pixel driver.

Referring to FIG. 6, timing requirements for tri-state driver/receiver circuits 38 driving the pixel lines are shown. FIG. 6 shows dual mode operation in a 32 bpp mode, where each 8 byte block of pixel data coming into the palette 14 is scanned out from the palette input MUX 28 in 4 byte blocks and processed. One pixel is delayed by a single PCLK and both are scanned out by an output pixel clock (POCLK), which runs at ½ the frequency of PCLK. $t_{PCC}$ is the period of PCLK, and $t_{OPCC}$ is the period of POCLK. FIG. 6 shows pixel driver 38 on device 0 (the Master) driving data onto LCD bus 44 for two POCLK cycles, pixel driver 38 for device 1 (the Slave) drives data onto bus 44 and the pixel receiver 38 on device 0 reads the data back onto the Master device 0 so that combined data can be sent to DAC 18 on device 0.

Specific microarchitecture enhancements of a Palette/DAC may be required for proper operation of the embedded frame buffers in dual embedded frame buffer mode. The synchronization of the PCLK, SCLK, and LCLK signals on the two embedded frame buffers are one important parameter.

In one embodiment, PCLK and SCLK signals are generated on the Master chip only, and transmit those signals to the Slave chip. Dead zone correction takes place on the Slave. A dead zone is defined as a situation that exists when the timing between graphics controller 50 and Palette/DAC 14 is such that data is lost during the clocked transfers of data between the memory and palette controlled by the load clock, LCLK, generated by graphics controller 50.

In another embodiment, both embedded frame buffer chips 10 operate essentially as in a single embedded frame buffer mode except that asynchronous control signals which set up and initiate SCLK modes are enabled by a synchronous control signal which is sent to both chips and ensures that both SCLK's start on the same PCLK cycle.

In addition, the logic required to combine the outputs of the two chips into a single digital and a single analog data stream are described herein. Three categories are described: 1) registers to control the output mode and PCLK PLL programming (a new input is also added whose function is to allow different values for these signals on the two chips), 2) a macro, PMSK, which generates mask signals to control the merging of the two data streams and 3) logic at the Palette/DAC output which uses the mask signals and control signals.

Dual Embedded Frame Buffer Clock Synchronization

Figure 8:
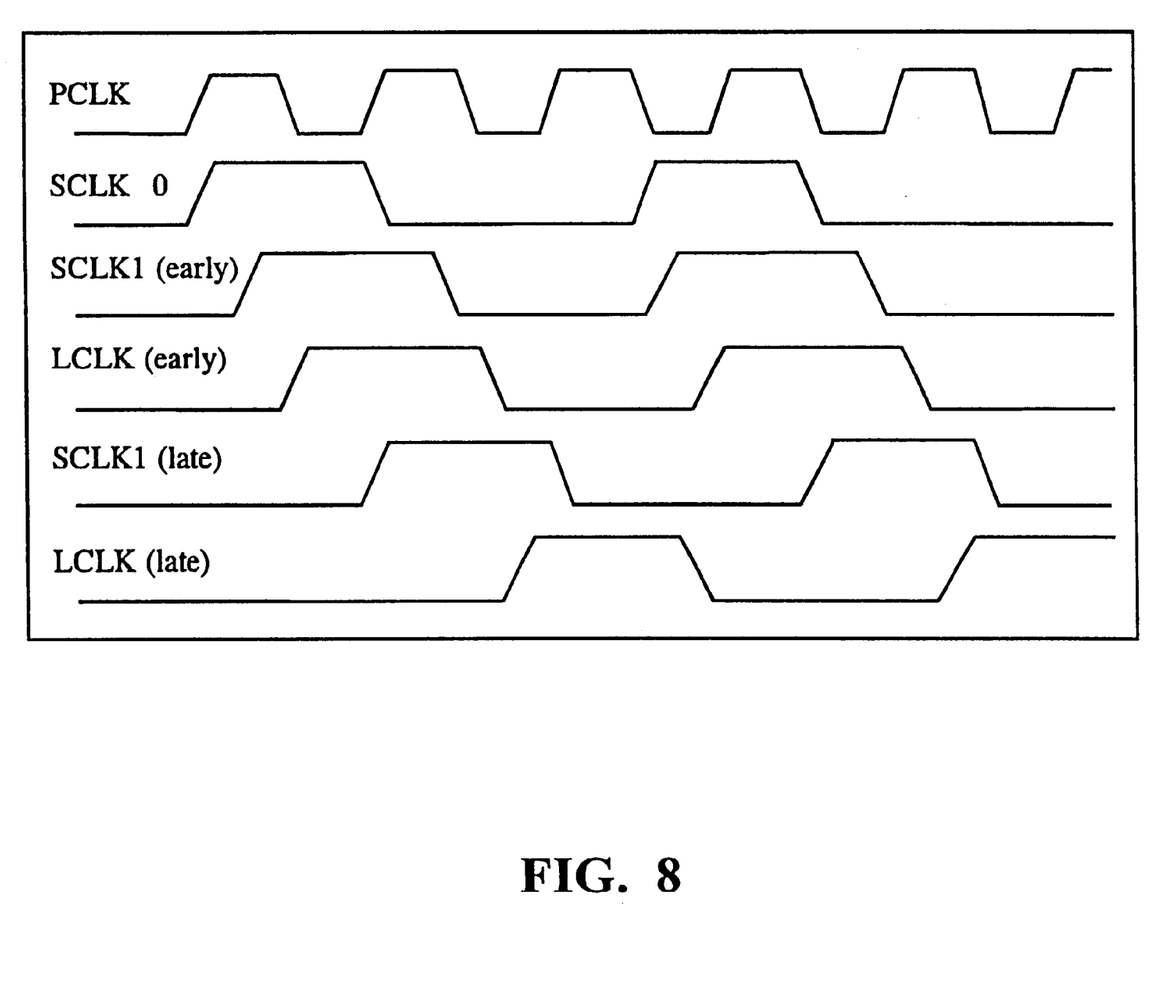
FIG. 8 is a timing diagram showing the clock synchronization in accordance with FIG. 7.

Referring to FIGS. 7 and 8, two or more embedded frame buffers 10 may be fabricated on a graphics card or chip 52. To permit synchronization of SCLK on two embedded frame buffers 10 in dual embedded frame buffer mode, the following method is used (Note: dual embedded frame buffer mode is preferably used for SXGA screen mode, with PCLK at about 157 MHz for an 85 Hz frame rate or 110 MHz for a 60 Hz frame rate):

1. PCLK is generated on device 0 (the Master) and is used to generate SCLK.

2. SCLK is sent to device 1 (the Slave) where it is input to a dead zone detect logic 54 to set the phase of the LCLK such that LCLK rises while SCLK is high. LCLK and SCLK now have the required phase relationship on device 1, and SCLK on device 0 is approximately 2 to 6 nsec earlier than SCLK on device 1.

3. The internal SCLK on device 0 is delayed by a programmable number of half-PCLK-cycles (about 3 nsec) to prevent it from falling before LCLK or rising too soon after LCLK. PCLK is likewise delayed zero or one half-cycle for use on-chip, to keep it phased properly with SCLK.

4. The PCLK on device 1 is derived from the un-delayed PCLK on device 0 by first dividing the frequency by two, then sending it to device 1 and then doubling the frequency back using the PCLK PLL with a multiplication factor of 2. This includes using the SLAVE pin to control use of different programming parameters in the Slave and Master chips. This procedure assures that the phase relationship between SCLK and PCLK is maintained on both chips, and avoids the problems associated with sending a high-frequency PCLK signal off-chip.

The timing method as described with reference to FIGS. 7 and 8 includes the following advantages:

1. Minimal changes to the Palette/DAC logic and timing.
2. Synchronization (within a known skew) is guaranteed between the two chips because there is only one SCLK generated. The labels for FIG. 8, represent clock signals in general and internal to each device, for example, SCLK1 represents SCLK for device 1.

Referring to FIG. 9, in the alternate embodiment, the PCLK and SCLK signals are generated simultaneously on both chips 10, relying on the common Refclk signal feeding both PLL's to provide approximate simultaneity of the two PCLK's. The asynchronous control signals which select the SCLK mode are gated by a synchronous signal, SCLK_SYNC, which is generated on the Master chip (device 0) and used on both Master and Slave. This signal assures that the SCLK on both chips starts on the same PCLK cycle. To avoid "dead zone" problems, where the control signal's timing is such that PLL jitter and skew could make it indeterminate which cycle the SCLK starts in, the control signal is delayed by two PCLK cycles on the Master chip and the undelayed control signal is sent to the Slave chip. The Dead Zone Detect logic 54 on the Slave (device 1) is then used to determine the phase of the SCLK relative to the LCLK, and the error signal is used to adjust the delay of SCLK_SYNC to start the SCLK on the correct PCLK cycle for synchronization of the SCLK and LCLK.

The timing method as described with reference to FIG. 9 includes the following advantages:

1. No transmission of clock signals between chips.
2. No concerns about SCLK-to-PCLK timing.

The data merging functions of the data from the two embedded frame buffers may now be described. The digital output of both chips is merged via the tristate output drivers 38, which are enabled by DATA VALID signals. The output bus 44 dots the data from the two chips together, such that each byte receives data from only one chip at a time. The pixel data can be either one or two pixels wide on the output bus.

Data from the Master, merged with the Slave data on the digital output bus, are transmitted to the LCD display panel. The merged data are also received back onto the chip. The data may be reserialized, if necessary, to one pixel wide for output to the DAC for analog (CRT) displays. This technique makes the timing of the two data streams similar, but may make it necessary to drive the data off-chip and back on again. This consumes power. Power consumption is not a significant issue when in CRT mode, however.

To enable proper recombination of the data from multiple embedded frame buffers at the output, signals are provided which permit masking (tri-stating) of the invalid data from one embedded frame buffer while merging with the valid data from the other embedded frame buffer. The PMSK macro generates these signals based on mode and synchronization signals from the serialized portion of Palette/DAC 14.

Having described preferred embodiments of an embedded frame buffer and method (which are intended to be illustrative and not limiting), it is noted that modifications and variations can be made by persons skilled in the art in light of the above teachings. For example, an embedded frame buffer includes tiling multiple devices each driving a portion of an LCD display and having a device as a master which also provides an analog output for a CRT. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by letters patent is set forth in the appended claims:

What is claimed is:

1. A method of synchronization of embedded frame buffers for data transfer through a single output comprises the steps of:

generating a first clock signal and a second clock signal in a master embedded frame buffer;

sending the first and second clock signals to a slave embedded frame buffer; and delaying the second clock signal to be in phase with a third clock signal generated by a graphics controller such that no data is lost when transferring data from the master and slave embedded frame buffers.

2. The method of synchronization of embedded frame buffers as recited in claim 1, wherein the step of delaying the second clock signal further comprises the step of delaying the second clock signal by a programmable number of half cycles of the first clock signal to prevent the second clock signal from falling too early before or rising too early after the third clock signal.

3. The method of synchronization of embedded frame buffers as recited in claim 1, further comprises the step of maintaining a phase relationship between the first and second clock signals on the slave embedded frame buffer.

4. The method of synchronization of embedded frame buffers as recited in claim 1, wherein the step of maintaining further comprises the steps of:

dividing an undelayed first clock signal frequency by two on the master embedded frame buffer;

sending the halved frequency to the slave embedded frame buffer; and doubling the halved frequency using a PLL with a multiplication of two.

5. A method of synchronization of embedded frame buffers to transfer data through a single output comprises the steps of:

sending a reference clock signal to a master embedded frame buffer and a slave embedded frame buffer; and generating a first clock signal and a second clock signal in the master embedded frame buffer and the slave embedded frame buffer which are enabled by the reference clock signal such that the second clock signals of the master and the slave embedded frame buffers start on the same cycle of the first clock signals of the master and the slave embedded frame buffers.

6. The method of synchronization of embedded frame buffers as recited in claim 5 further comprises the steps of:

synchronizing a third clock signal from a graphics controller with the second clock signal such that no data is lost when transferring data from the master and slave embedded frame buffers.

7. A method of synchronization of embedded frame buffers for data transfer through a single output comprises the steps of:

providing multiple embedded memory frame buffer system comprising a master graphics subsystem and a plurality of slave graphics subsystems, each subsystem including a frame buffer and a color palette for decompressing data in the frame buffer, the master subsystem further including a digital to analog converter coupled to receive the decompressed digital data from the palette of each subsystem and outputting analog versions of the digital data to an output device, wherein the multiple embedded memory frame buffer system further includes a timing system for determining which outputs of the subsystems are to be converted by the digital to analog converter at a given time;

generating a first clock signal and a second clock signal in the master graphics subsystem;

sending the first and second clock signals to the plurality of slave graphics subsystems; and delaying the second clock signal to be in phase with a third clock signal generated by a graphics controller such that no data is lost when transferring data from the master and slave graphics subsystems.

8. The method of synchronization of embedded frame buffers as recited in claim 7, wherein the step of delaying the second clock signal further comprises the step of delaying the second clock signal by a programmable number of half cycles of the first clock signal to prevent the second clock signal from falling too early before or rising too early after the third clock signal.

9. The method of synchronization of embedded frame buffers as recited in claim 7, further comprises the step of maintaining a phase relationship between the first and second clock signals on the slave graphics subsystems.

10. The method of synchronization of embedded frame buffers as recited in claim 7, wherein the step of maintaining further comprises the steps of:

dividing an undelayed first clock signal frequency by two on the master graphics subsystem;

sending the halved frequency to the slave graphics subsystems; and doubling the halved frequency using a PLL with a multiplication of two.

11. A method of synchronization of embedded frame buffers to transfer data through a single output comprising the steps of:

providing a multiple embedded memory frame buffer system comprising a master graphics subsystem and a plurality of slave graphics subsystems, each subsystem including a frame buffer and a color palette for decompressing data in the frame buffer, the master subsystem further including a digital to analog converter coupled to receive the decompressed digital data from the palette of each subsystem and outputting analog versions of the digital data to an output device, wherein the multiple embedded memory frame buffer system further includes a timing system for determining which outputs of the subsystems are to be converted by the digital to analog converter at a given time;

sending a reference clock signal to a master graphics subsystem and a slave graphics subsystem; and generating a first clock signal and a second clock signal in the master graphics subsystem and the slave graphics subsystem which are enabled by the reference clock signal such that the second clock signals of the master and the slave graphics subsystems start on the same cycle of the first clock signals of the master and the slave graphics subsystems.

12. The method of synchronization of embedded frame buffers as recited in claim 11 further comprises the steps of:

synchronizing a third clock signal from a graphics controller with the second clock signal such that no data is lost when transferring data from the master and slave graphics subsystems.

* * * * *